(12) United States Patent
Roy et al.

(10) Patent No.: US 9,106,151 B2
(45) Date of Patent: Aug. 11, 2015

(54) POWER-FACTOR-IMPROVING CIRCUIT AND METHOD FOR AN OFFLINE CONVERTER

(71) Applicant: Richtek Technology Corp., Chupei, Hsinchu (TW)

(72) Inventors: Roland Van Roy, Eindhoven (NL); Leng-Nien Hsiu, Zhubei (TW); Pei-Yuan Chen, Longtan Township, Taoyuan County (TW)

(73) Assignee: RICHTEK TECHNOLOGY CORP., Chupei (TW)

( * ) Notice: Subject to any disclaimer, the term of this patent is extended or adjusted under 35 U.S.C. 154(b) by 113 days.

(21) Appl. No.: 13/659,431

(22) Filed: Oct. 24, 2012

(65) Prior Publication Data

US 2013/0107591 A1    May 2, 2013

(30) Foreign Application Priority Data

Oct. 28, 2011    (TW) .............................. 100139378 A

(51) Int. Cl.
| | |
|---|---|
| G05F 5/00 | (2006.01) |
| H02M 1/42 | (2007.01) |
| H02M 1/00 | (2007.01) |

(52) U.S. Cl.
CPC .... *H02M 1/4258* (2013.01); *H02M 2001/0025* (2013.01); *Y02B 70/126* (2013.01)

(58) Field of Classification Search
CPC .................................................. H02M 3/33523
USPC .......... 363/80, 81, 82, 84, 86, 89, 127, 21.04, 363/21.05, 21, 12, 21.13; 323/205, 207, 323/266, 345, 356, 905, 208, 209, 210, 323/211; 315/247, 291
See application file for complete search history.

(56) References Cited

U.S. PATENT DOCUMENTS

| | | | |
|---|---|---|---|
| 6,259,613 B1 * | 7/2001 | Lee et al. ......................... 363/89 |
| 6,927,544 B2 * | 8/2005 | Nostwick ....................... 315/247 |
| 2008/0278092 A1 * | 11/2008 | Lys et al. ....................... 315/247 |
| 2011/0109230 A1 * | 5/2011 | Simi ............................. 315/119 |

* cited by examiner

*Primary Examiner* — Adolf Berhane
*Assistant Examiner* — Alex Torres-Rivera
(74) *Attorney, Agent, or Firm* — Muncy, Geissler, Olds & Lowe, P.C.

(57) ABSTRACT

A power-factor-improving circuit and method for an offline converter block the DC component and obtain the AC component of an input voltage of the offline converter. The AC component is superpositioned onto a DC bias signal to generate a dimming signal for the offline converter to adjust an output current of the offline converter. The offline converter has a high power factor due to the dimming signal with the AC component of the input voltage. In addition, the average of the dimming signal is determined by the DC bias signal, hence the output current can be precisely controlled according to the DC bias signal.

4 Claims, 10 Drawing Sheets

POWER-FACTOR-IMPROVING CIRCUIT AND METHOD FOR AN OFFLINE CONVERTER

FIELD OF THE INVENTION

The present invention is related generally to a power-factor-improving circuit and method, especially for an offline converter.

BACKGROUND OF THE INVENTION

FIG. 1 is a diagram depicting a power supply 10 driving light emitting diodes (LEDs). The power supply 10 includes a bridge rectifier 14 for rectifying an AC voltage VAC and an offline converter 16 for providing an output current Io to an LED 12. Conventionally, the offline converter 16 adjusts the output current Io according to a dimming signal Sdim. As shown in FIG. 2, the output current Io is proportional to the voltage level of the dimming signal Sdim. The average of the output current Io determines the brightness of the LED 12, and thus the brightness of the LED 12 can be adjusted by changing the dimming signal Sdim.

However, as shown by waveforms 20 and 22 in FIG. 4, the input voltage VIN to the offline converter 16 has a periodic waveform, and thus the AC information of the input voltage VIN is necessary for the offline converter 16 to have a high power factor. As shown in FIG. 3, a conventional power-factor-improving method uses serially connected resistors R1 and R2 to divide the input voltage VIN for generating the dimming signal Sdim for the offline converter 16, which thus contains the AC component of the input voltage VIN, to improve the power factor of the offline converter 16. This approach, however, causes the average of the dimming signal Sdim to vary with the DC component of the input voltage VIN, so the average of the output current Io cannot be accurately controlled under the influence of the DC component of the input voltage VIN. FIG. 4 shows waveforms of the dimming signal Sdim under different input voltages VIN. When the input voltage VIN is higher, as shown by waveform 20, the input voltage VIN has a greater DC component VHavg, so the obtained dimming signal Sdim has a greater average Vavg1, as shown by waveform 24, thereby making the offline converter 16 provide a greater output current Io. When the input voltage VIN is lower, as shown by waveform 22, the DC component VLavg of the input voltage VIN is smaller, so the obtained dimming signal Sdim has a smaller average Vavg2, as shown by waveform 26, so the offline converter 16 provides a smaller output current Io.

Therefore, it is desired a circuit and method for improving the power factor and accurately controlling the output current of an offline converter.

SUMMARY OF THE INVENTION

An objective of the present invention is to provide a power-factor-improving circuit and method for an offline converter.

Another objective of the present invention is to provide a high power factor offline converter for accurately controlling the output current thereof.

According to the present invention, a power-factor-improving circuit for an offline converter includes a voltage detector and a DC bias circuit. The voltage detector blocks the DC component of the input voltage of the offline converter and detects the AC component of the input voltage to obtain a detection signal which is proportional to the AC component. The DC bias circuit provides a DC bias signal to superpose on the detection signal to generate a dimming signal for the offline converter to adjust the output current of the offline converter.

According to the present invention, a power-factor-improving method for an offline converter includes blocking the DC component of an input voltage of the offline converter to obtain a detection signal which is proportional to the AC component of the input voltage, superposing the detection signal onto a DC bias signal to generate a dimming signal, and determining the output current of the offline converter according to the dimming signal.

According to the present invention, an offline converter includes a controller that determines the output current of the offline converter according to a dimming signal, and a power-factor-improving circuit that provides the dimming signal. The power-factor-improving circuit includes a voltage detector and a DC bias circuit. The voltage detector blocks the DC component of the input voltage of the offline converter and obtains a detection signal which is proportional to the AC component of the input voltage. The DC bias circuit provides a DC bias signal to superpose onto the detection signal to generate the dimming signal.

Since the dimming signal provided by the power-factor-improving circuit contains the AC component of the input voltage of the offline converter, it makes the offline converter achieve a high power factor. In addition, since the average of the dimming signal is determined by the DC bias signal, the average of the output current of the offline converter can be accurately controlled through controlling the DC bias signal.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
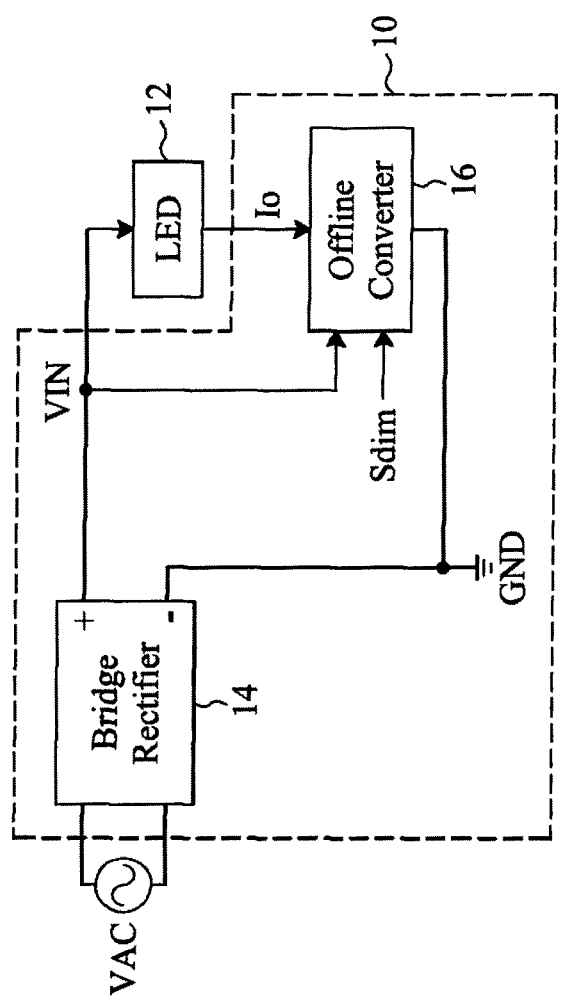
FIG. 1 shows a conventional LED driver.
Figure 2:
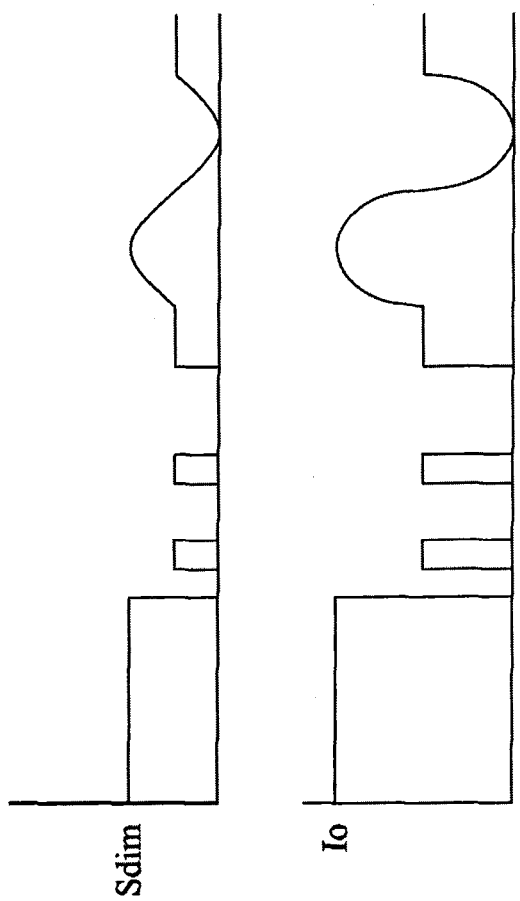
FIG. 2 shows waveforms of the dimming signal and the output current of FIG. 1.
Figure 3:
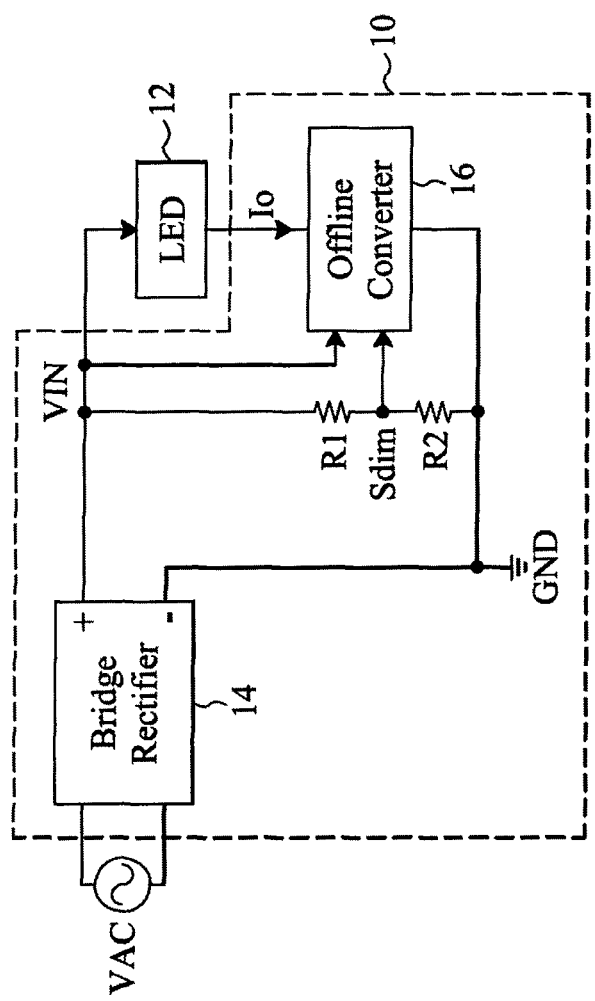
FIG. 3 shows a conventional method for improving the power factor of an offline converter.
Figure 4:
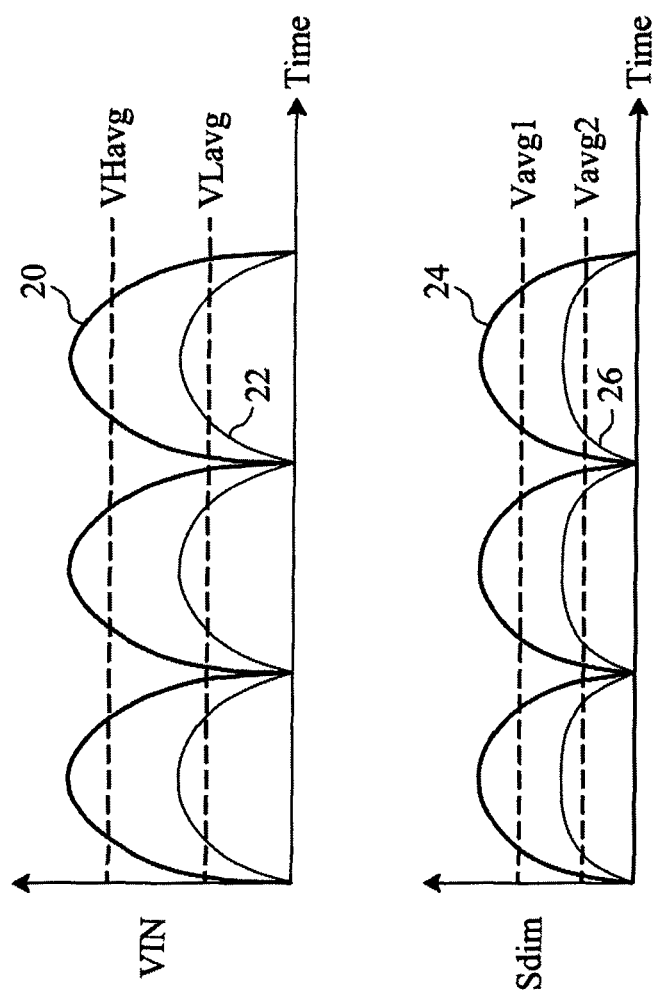
FIG. 4 shows waveforms of the input voltage and the dimming signal of FIG. 3.
Figure 5:
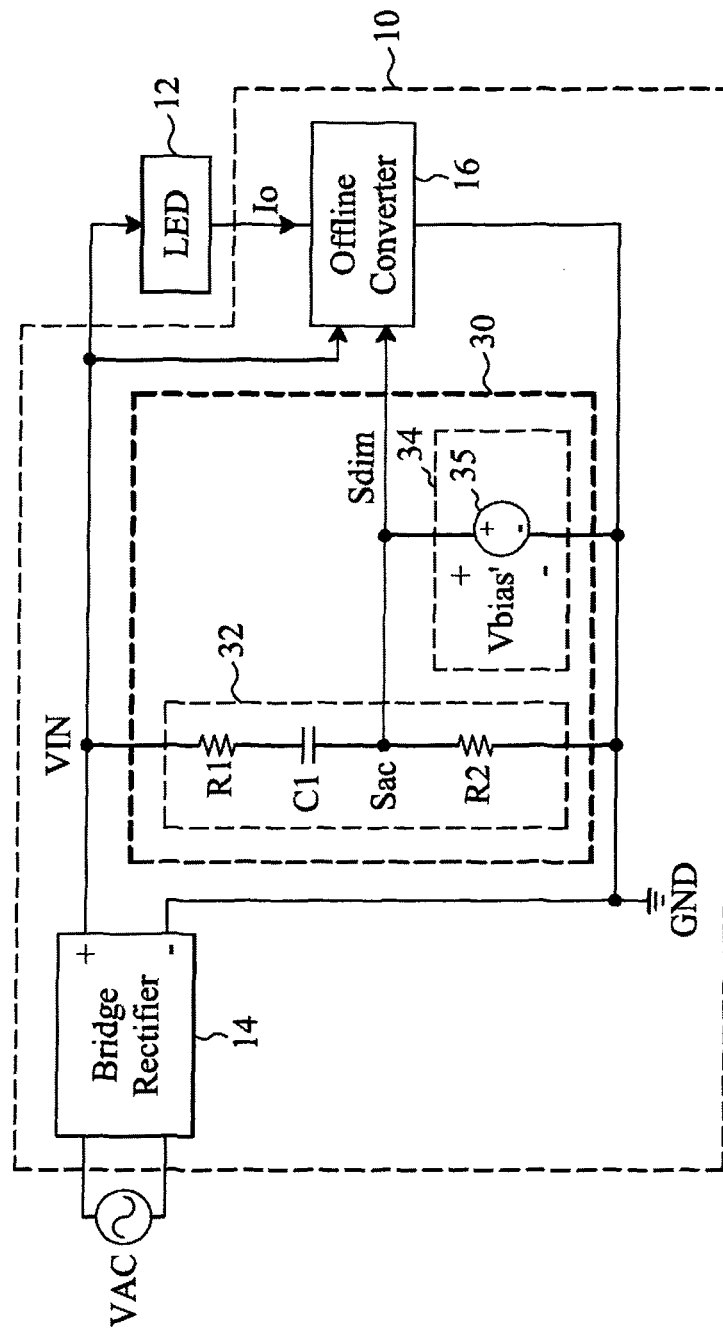
FIG. 5 shows a first embodiment of a power-factor-improving circuit according to the present invention.

FIG. 5 shows a power supply 10 including a bridge rectifier 14 and an offline converter 16 as shown in FIG. 1. However, this power supply 10 further includes a power-factor-improving circuit 30 for providing the dimming signal Sdim for the offline converter 16 according to the input voltage VIN of the offline converter 16. The power-factor-improving circuit 30 includes a voltage detector 32 and a DC bias circuit 34. The voltage detector 32 includes resistors R1 and R2 connected in series between the voltage input terminal VIN and ground GND, and a decoupling capacitor C1 connected in series to the resistor R1 between the voltage input terminal VIN and the resistor R2. The decoupling capacitor C1 is so configured to block the DC component of the input voltage VIN. The resistors R1 and R2 divide the AC component of the input voltage VIN to generate a detection signal Sac which is superposed onto a DC bias signal Vbias' provided by the DC bias circuit 34 to generate the dimming signal Sdim. The DC bias circuit 34 includes a voltage source 35 to provide the DC bias signal Vbias'. Since the DC component of the input voltage VIN is blocked by the decoupling capacitor C1, the DC level of the detection signal Sac is zero. Therefore, after the detection signal Sac is superposed onto the DC bias signal Vbias' to generate the dimming signal Sdim, the dimming signal Sdim has a DC level (i.e. an average) equal to the DC bias signal Vbias'. In other words, the DC bias signal Vbias' determines the average of the output current Io of the offline converter 16, so it is feasible to accurately control the average of the output current. To by controlling the DC bias signal Vbias'. Additionally, since the AC component of the dimming signal Sdim is determined by the detection signal Sac, and the detection signal Sac is proportional to the AC component of the input voltage VIN, the dimming signal Sdim contains the AC component of the input voltage VIN, so it enables the offline converter 16 to achieve a high power factor. In this embodiment, the decoupling capacitor C1 is used to block the DC component of the input voltage VIN. In other embodiments, other devices or circuits capable of blocking the DC component of the input voltage VIN may be used instead of the decoupling capacitor C1.

Figure 6:
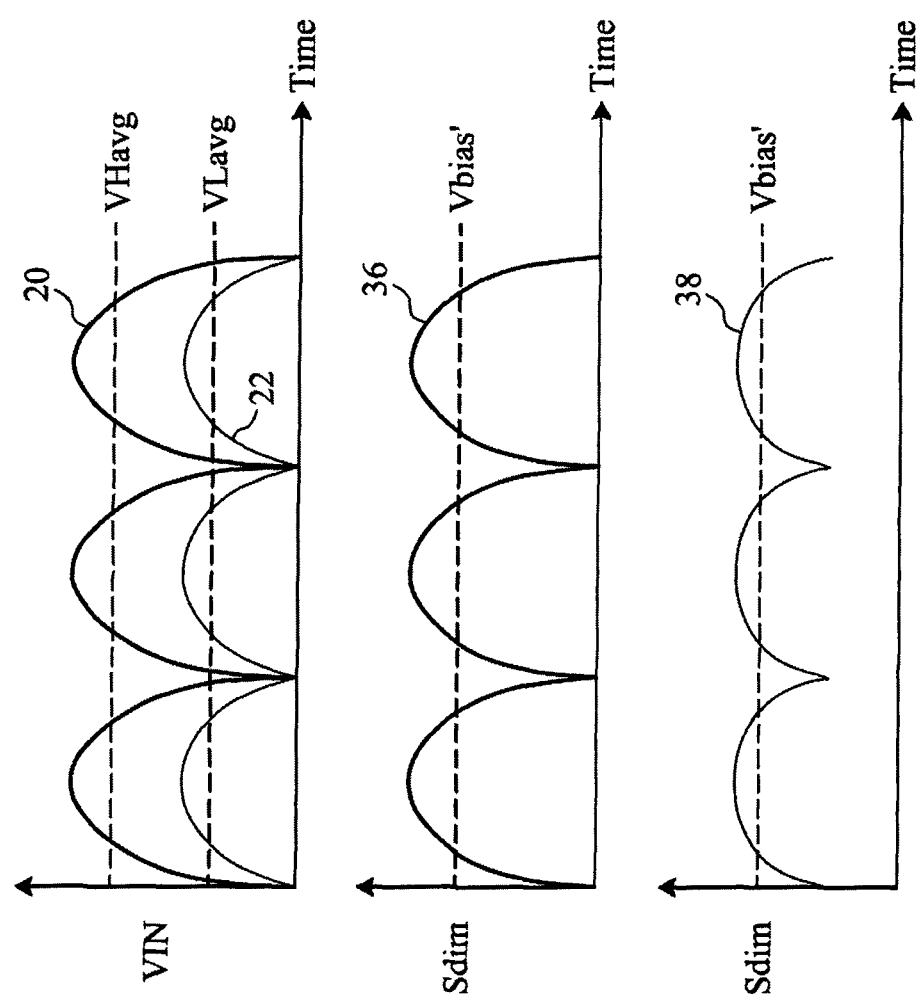
FIG. 6 shows waveforms of the input voltage and the dimming signal of FIG. 5.

For readers' easy understanding, FIG. 6 shows a waveform of the dimming signal Sdim of FIG. 5 under different input voltages VIN. When the input voltage VIN is higher, as shown by waveform 20 in FIG. 6, after the power-factor-improving circuit 30 blocks the DC component VHavg of the input voltage VIN, the AC component of the input voltage VIN is divided and superposed onto the DC bias signal Vbias' to generate the dimming signal Sdim as shown by waveform 36 in FIG. 6. When the input voltage VIN is lower, as shown by waveform 22 in FIG. 6, after the power-factor-improving circuit 30 blocks the DC component VLavg of the input voltage VIN, the AC component of the input voltage VIN is divided and superposed onto the DC bias signal Vbias' to generate the dimming signal Sdim as shown by waveform 38 in FIG. 6. As can be learned from the waveforms 36 and 38 in FIG. 6, whether the input voltage VIN is high or low, the DC level of the dimming signal Sdim is equal to the DC bias signal Vbias', and the AC component of the dimming signal Sdim is proportional to the AC component of the input voltage VIN.

The offline converter 16 of FIG. 5 may be an offline converter of one of various types, including boost, buck, non-isolation and isolation ones, and the power-factor-improving circuit 30 may be integrated into the offline converter 16.

Figure 7:
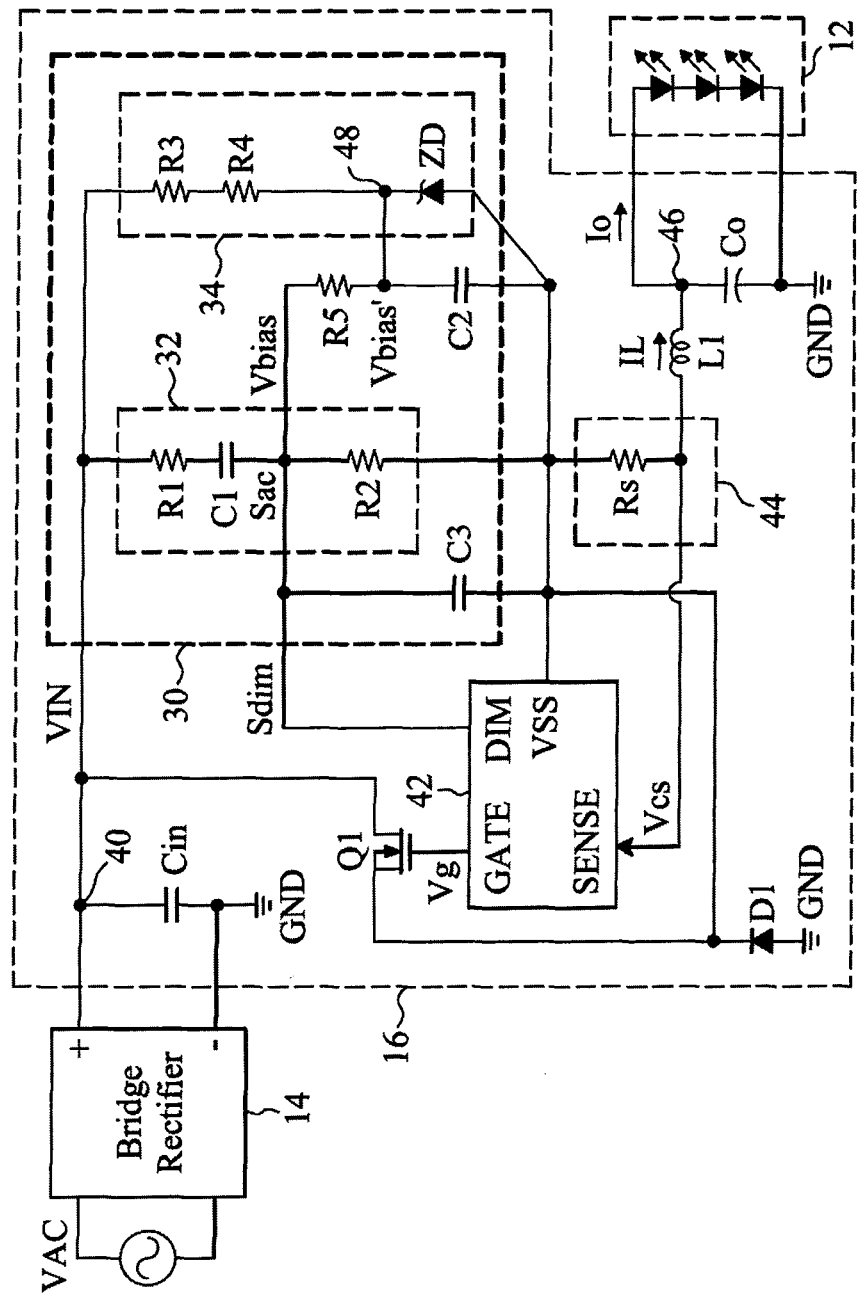
FIG. 7 shows a second embodiment of the power-factor-improving circuit according to the present invention.

FIG. 7 shows a second embodiment of the power-factor-improving circuit 30 according to the present invention, in which the offline converter 16 is an offline non-isolation buck converter, and the power-factor-improving circuit 30 is integrated into the offline converter 16. In the offline converter 16 of FIG. 7, the voltage input terminal 40 of the offline converter 16 receives the input voltage VIN, a power switch Q1 and a diode D1 are connected in series between the voltage input terminal 40 and ground terminal GND, an inductor L1 is connected between the power switch Q1 and the output terminal 46 of the offline converter 16, a current sensor 44 including a resistor Rs is connected in series to the inductor L1 for sensing the current IL of the inductor L1 to generate a current sense signal Vcs, a power-factor-improving circuit 30 detects the input voltage VIN at the voltage input terminal 40 of the offline converter 16 to generate the dimming signal Sdim, and a controller 42 determines a control signal Vg according to the dimming signal Sdim and the current sense signal Vcs for switching the power switch Q1.

The power-factor-improving circuit 30 of FIG. 7 includes a voltage detector 32, a DC bias circuit 34, a resistor R5, and capacitors C2 and C3. The voltage detector 32 includes a decoupling capacitor C1 for blocking the DC component of the input voltage VIN and resistors R1 and R2 for dividing the AC component of the input voltage VIN to generate the detection signal Sac. The DC bias circuit 34 includes resistors R3 and R4 and a Zener diode ZD. The resistors R3 and R4 are used as a current limit resistor for limiting the current of the Zener diode ZD. The Zener diode ZD has its cathode connected to the output terminal 48 of the DC bias circuit 34, and also connected to the voltage input terminal 40 of the offline converter 16 through the resistors R3 and R4. When the input voltage VIN is higher than the breakdown voltage of the Zener diode ZD, the Zener diode ZD becomes reverse biased, and the voltage at its cathode remains constant, so the DC bias circuit 34 will provide a stable DC bias signal Vbias'. The resistors R5 and R2 establish a voltage divider to divide the DC bias signal Vbias' for generating the DC bias signal Vbias to superpose onto the detection signal Sac to generate the dimming signal Sdim. The capacitors C2 and C3 are used to filter off unexpected surges.

Figure 8:
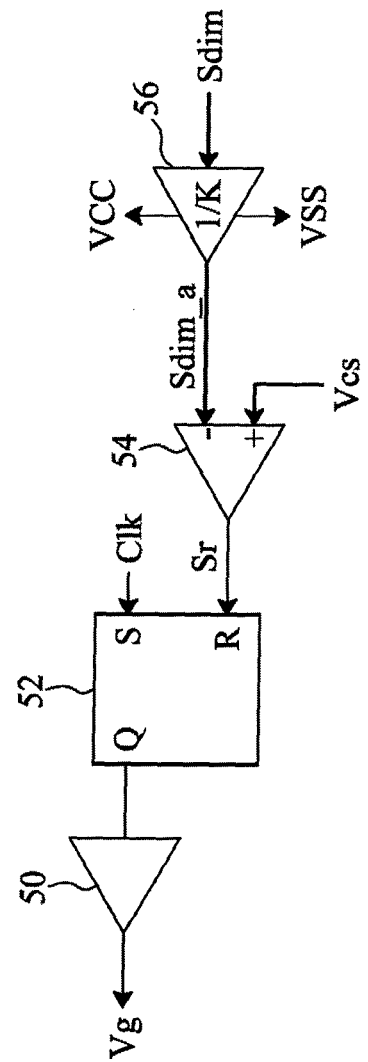
FIG. 8 is an embodiment of the controller of FIG. 7.

FIG. 8 is an embodiment of the controller 42 of FIG. 7, which includes a driver 50, a flip-flop 52, a comparator 54, and an amplifier 56. The amplifier 56 linearly amplifies the dimming signal Sdim to generate a dimming signal Sdim_a. The comparator 54 compares the dimming signal Sdim_a to the current sense signal Vcs to generate a comparison signal Sr. The flip-flop 52 has a set terminal S to receive a clock signal Clk and a reset terminal R to receive the comparison signal Sr, and thus generates a signal Q for the driver 50 to generate the control signal Vg. In other embodiments, the amplifier 56 may be omitted or replaced by another device, such as a buffer.

Figure 9:
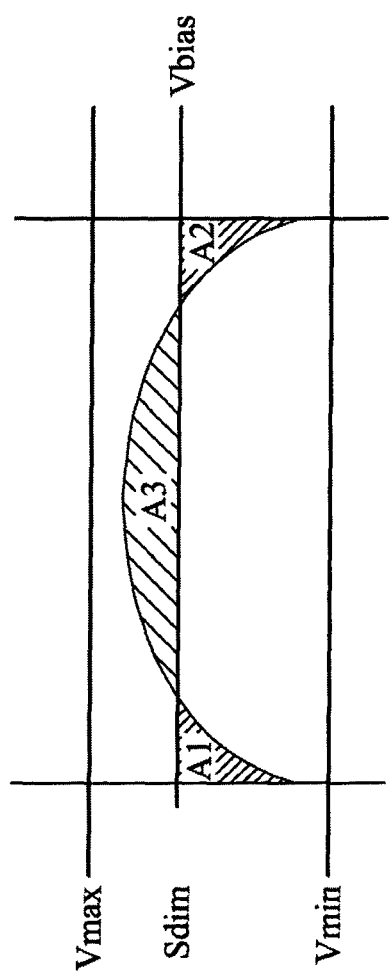
FIG. 9 shows a waveform of the dimming signal of FIG. 8.

In the embodiment of FIG. 8, the amplifier 56 has a gain of 1/K and its power-source terminals receive voltages VCC and VSS, respectively. When the amplified dimming signal Sdim_a has its maximum greater than the voltage VCC or has its minimum lower than the voltage VSS, misoperation can happen. Thus, the waveform of the dimming signal Sdim_a has to stay between the voltages VCC and VSS. In other words, the dimming signal Sdim must remain within the range between an upper limit Vmax=VCC×K and a lower limit Vmin=VSS×K, as shown in FIG. 9. In FIG. 9, there are three areas between the dimming signal Sdim and the DC bias signal Vbias, namely, the areas A1 and A2 where the DC bias signal Vbias is higher than the dimming signal Sdim, and the area A3 where the DC bias signal Vbias is lower than the dimming signal Sdim. Since the average of the dimming signal Sdim is equal to the DC bias signal Vbias, A3=A1+A2.

Figure 10:
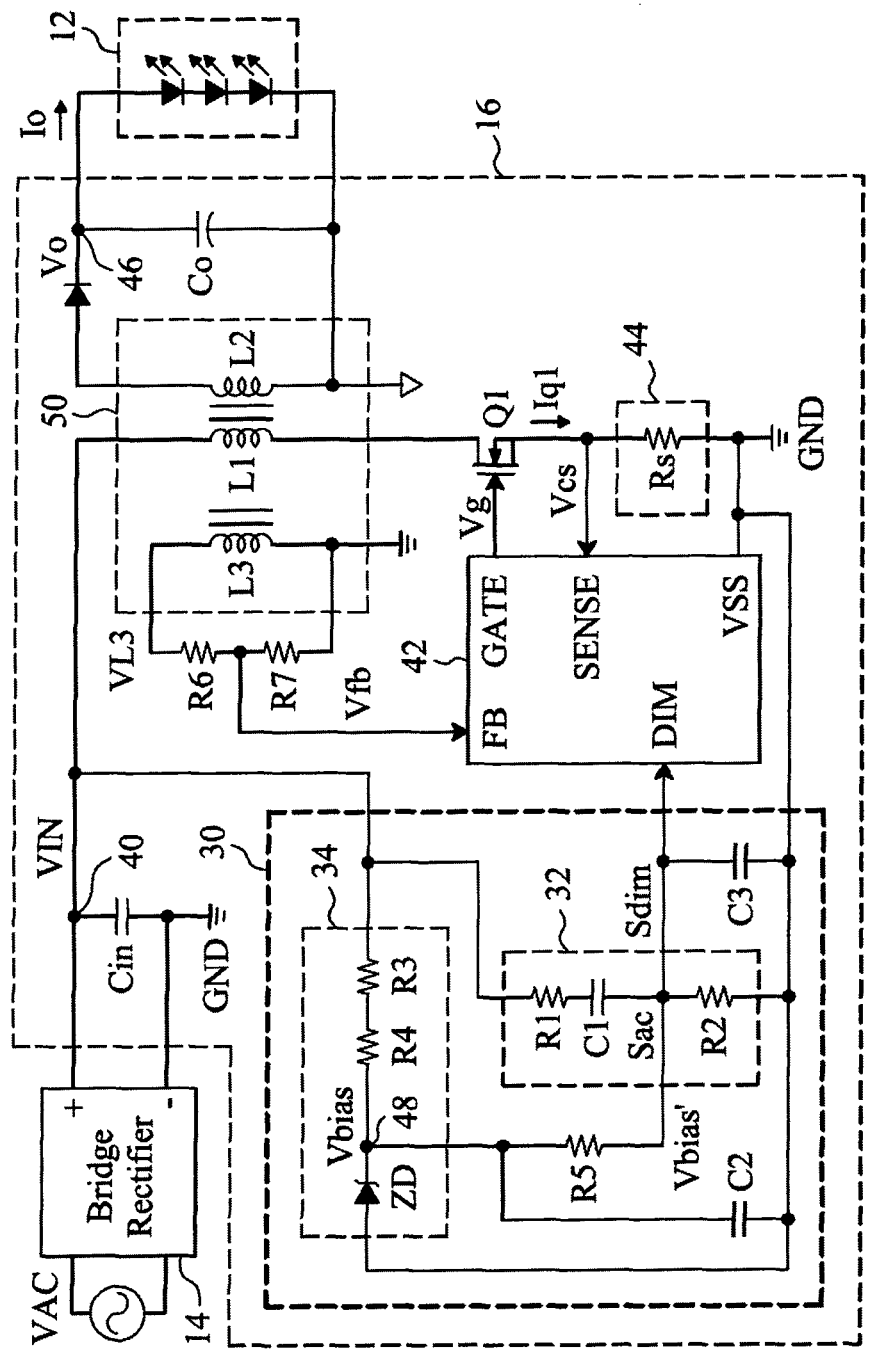
FIG. 10 shows an embodiment of a power-factor-improving circuit applied in an offline isolation converter.

The power-factor-improving circuit 30 according to the present invention may be useful to an offline isolation converter. In FIG. 10, the offline converter 16 is an offline isolation converter, which has a power-factor-improving circuit 30 for detecting the input voltage VIN to generate a dimming signal Sdim. The power-factor-improving circuit 30 of FIG. 10, similar to the circuit of FIG. 7, has a voltage detector 32, a DC bias circuit 34, a resistor R5, and capacitors C2 and C3. The offline converter 16 has a transformer 50 including a primary coil L1, a secondary coil L2, and an auxiliary coil L3. The primary coil L1 and the power switch Q1 are connected in series between the voltage input terminal 40 and ground terminal GND. The secondary coil L2 is connected to the output terminal 46. The auxiliary coil L3 is used to sense the voltage Vo of the secondary coil L2 to generate a voltage VL3. Serially connected resistors R6 and R7 are connected to the auxiliary coil L3, for dividing the voltage VL3 to generate a voltage Vfb for the controller 42, enabling the feedback network path to achieve constant current and constant voltage. The current sensor 44 includes a resistor Rs connected in series to the power switch Q1, for sensing the current Iq1 of the power switch Q1 to generate the current sense signal Vcs. The controller 42 determines the control signal Vg according to the dimming signal Sdim and the current sense signal Vcs for switching the power switch Q1 and in turn controlling the output current Io at the output terminal 46. The controller 42 of FIG. 10 is conceptually similar to the circuit of FIG. 8, and people skilled in the art would derive the circuit of controller 42 from the circuit of FIG. 8.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An offline converter with a high power factor, comprising:
   a controller configured to determine an output current of the offline converter according to a dimming signal;
   a power switch connected to the controller, controlled by a control signal from the controller to adjust the output current;
   an inductor connected between the power switch and an output terminal of the offline converter;
   a current sensor connected to the inductor, configured to sense a current of the inductor to generate a current sense signal for the controller; and
   a power-factor-improving circuit including:
      a voltage detector configured to block a DC component of an input voltage of the offline converter and obtain a detection signal which is proportional to an AC component of the input voltage; and
      a DC bias circuit connected to the voltage detector and the controller, configured to provide a DC bias signal to superpose on the detection signal to generate the dimming signal,
   wherein the controller comprises:
      an amplifier configured to linearly amplify the dimming signal to generate an amplified dimming signal;
      a comparator connected to the amplifier, configured to compare the current sense signal to the amplified dimming signal to generate a comparison signal; and
      a flip-flop having a set terminal to receive a clock signal and a reset terminal to receive the comparison signal, and determining the control signal according to the clock signal and the comparison signal.

2. The offline converter of claim 1, wherein the voltage detector comprises:
   a first resistor and a second resistor connected in series and connected to an input terminal of the offline converter, configured to divide the AC component of the input voltage to generate the detection signal; and
   a decoupling capacitor connected in series to the first resistor between a voltage input terminal of the offline converter and the second resistor, blocking the DC component of the input voltage.

3. The offline converter of claim 1, wherein the DC bias circuit comprises a voltage source providing the DC bias signal.

4. The offline converter of claim 1, wherein the DC bias circuit comprises:
   a Zener diode having a cathode connected to an output terminal of the DC bias circuit, configured to determine the DC bias signal; and
   a current limit resistor connected between the cathode of the Zener diode and an input terminal of the offline converter, configured to limit a current passing through the Zener diode.

* * * * *